United States Patent
Kimura

(10) Patent No.: US 7,553,095 B2
(45) Date of Patent: Jun. 30, 2009

(54) PRINT DATA TRANSMITTING APPARATUS, IMAGE FORMING SYSTEM, PRINTING CONDITION SETTING METHOD AND PRINTER DRIVER PROGRAM

(75) Inventor: Nobuyuki Kimura, Chofu (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 717 days.

(21) Appl. No.: 10/890,566

(22) Filed: Jul. 12, 2004

(65) Prior Publication Data

US 2005/0117175 A1   Jun. 2, 2005

(30) Foreign Application Priority Data

Nov. 27, 2003   (JP) .............................. 2003-396678

(51) Int. Cl.
  G03G 15/00   (2006.01)
  B65H 7/00   (2006.01)
(52) U.S. Cl. ............................. 400/62; 400/76; 399/382
(58) Field of Classification Search ............... 400/62, 400/70, 76; 358/1.1; 399/81, 82
See application file for complete search history.

(56) References Cited

U.S. PATENT DOCUMENTS

| | | | |
|---|---|---|---|
| 5,722,029 A | 2/1998 | Tomidokoro et al. | |
| 6,393,232 B1 | 5/2002 | Osari et al. | |
| 6,571,072 B1 | 5/2003 | Sugimoto | |
| 6,799,005 B2* | 9/2004 | Bodine et al. | 399/82 |
| 6,937,829 B2* | 8/2005 | Sato et al. | 399/82 |
| 2002/0146256 A1 | 10/2002 | Sekiguchi et al. | |
| 2003/0026626 A1* | 2/2003 | Sunada et al. | 399/82 |

FOREIGN PATENT DOCUMENTS

| | | |
|---|---|---|
| JP | 04-361083 A | 12/1992 |
| JP | 2001-278530 A | 10/2001 |
| JP | 2003-005944 A | 1/2003 |

* cited by examiner

*Primary Examiner*—Daniel J Colilla
(74) *Attorney, Agent, or Firm*—Frishauf, Holtz, Goodman & Chick, P.C.

(57) ABSTRACT

A print data transmitting apparatus for transmitting print data to an image forming apparatus having a function of creating a printed material including a plurality of pages by inserting a plurality of sheets of special paper constituting one set into a predetermined position one by one. The print data transmitting apparatus comprises a number-of-constituent-sheets acquiring section for acquiring the number of sheets constituting one set of special paper, and an insertion information inputting section for receiving designation of insertion page position where special paper is to be inserted in the printed material, with using a unit of number of the page positions, the number of the page positions being equal to the number of sheets constituting one set of special paper.

18 Claims, 7 Drawing Sheets

PRINT DATA TRANSMITTING APPARATUS, IMAGE FORMING SYSTEM, PRINTING CONDITION SETTING METHOD AND PRINTER DRIVER PROGRAM

BACKGROUND OF THE INVENTION

The present invention relates to an image forming system for creating printed materials by inserting such special paper as tab paper for chapter separation between pages.

To produce a printed material including a plurality of chapters in the prior art, some of such image forming apparatuses as printers or copying machines are provided with a function of creating a printed material by inserting such special paper (facilitating material) for chapter separation at a designated page position. The special paper (facilitating material) includes tab paper used as an index paper for chapter separation or color sheets having different colors, as shown in FIG. 10. FIG. 10 shows an example of a five-sheet tab paper set 500, where one set is composed of five tab sheets.

The tab sheet is set on a paper feed section different from the recording paper used for normal printing, for example, on a manual tray. The image forming apparatus is designed in such a manner that, only when printing the page specified as a tab paper insertion position, the paper feed source is switched over to the paper feed section where tab paper is set, and the chapter numbers are printed on the tabs 511 through 513 of tab paper 501 through 503 having been fed, whereby a printed material 520 shown in FIG. 11 is created.

In the sheets of tab paper 501 through 505, the positions of the tabs 511 through 515 are different as shown in FIG. 10. The arrangement order of the sheets of tab paper 501 through 505 is determined in one set. When tab paper is inserted between the pages of the printed materials, it is a common practice that the tab paper 501 located at the first position is used first. Based on the practice, the image forming apparatus is configured in such a way that the chapter number printing position is varied in response to the tab position.

For example, when use of a 5-sheet tab paper set 500 has been set, the image forming apparatus adjusts the print position of the tabs 511 through 515 on the premise that the length of one of the tabs 511 through 515 is one fifth the longitudinal length of one of the sheets of tab paper 501 through 505; each of the tab positions of the sheets of tab paper 501 through 505 is varied from the other by one tab from the top to bottom of the sheet; and gets back to the top end upon arrival to the bottom, whereby the print position for tabs 511 through 515 is adjusted.

Incidentally, if the number of the tab sheets (e.g. 3) to be inserted in a printed material is not an integral multiple of the number of sheets of tab paper (e.g. 5) constituting one set and if the next printed material is printed immediately after printing of this printed material or a plurality of copies are printed, then the tab paper which is not in the first position of the set will be first fed in the next print or second and subsequent print. As a result, the tab position assumed by the image forming apparatus will be different from the actual position of the tab paper, and printing on the tab will end in a failure.

To solve this problem, an image forming apparatus (e.g. Patent Document 1) is proposed, wherein, from the number of the sheets of tab paper to be inserted in a printed material and the number of the sheets of tab paper constituting one set, calculation is made to see whether or not any excess tab paper occurs; and if any excess tab paper occurs, it is removed.

[Patent Document 1]

Official Gazette of Japanese Patent Tokkaihei 4-361083

When the image forming apparatus detects the presence of excess tab paper and removes it, the user recognizes the presence of excess tab paper only when it has been removed. 0This makes it difficult to take previous measures to prohibit the need of removing excess sheets, for example, by replacing the tab paper by that of different number of sheets constituting one set or by making prior adjustment to ensure that there will be no excess in the number of sheets of tab paper inserted into the printed material. In this sense, the prior art has the problem of poor usability.

Furthermore, the image forming apparatus detects the presence of excess tab paper and removes it. Thus, in the prior art, the existing image forming apparatus without such a function has been unable to solve the problem involved in the generation of excess tab paper.

The present invention is an attempt to solve these problems. It is an object of the present invention to provide a print data transmission apparatus, an image forming system, a print condition setting method and a printer driver capable of setting the printing conditions so as to avoid presence of excess special paper in creating an printed material by inserting a plurality of sheets of special paper such as tab paper constituting one set into a designated page position.

Another object of the present invention is to provide a print data transmission apparatus, an image forming system, a print condition setting method and a printer driver capable of solve the problems of generating excess special paper on the existing image forming apparatus.

SUMMARY OF THE INVENTION (1) One aspect of the invention is concerted with a print data transmitting apparatus 100 for transmitting print data to an image forming apparatus 10 having a function of creating a printed material including a plurality of pages by inserting a plurality of sheets of special paper constituting one set into a predetermined position one by one, wherein this print data transmitting apparatus 100 includes a number-of-constituent sheets acquiring section 101, 210 for acquiring the number of sheets of special paper constituting one set, and an insertion information inputting section (102, 200) for receiving designation of the page position where special paper is inserted in the printed material, using the position of inserting one set of special paper as one unit.

The aforementioned print data transmitting apparatus 100 receives designation of the page position where special paper is inserted in the printed material, using one set of special paper as one unit. To receive one set of special paper as one unit is to enable designation of the page position so that the total of the number of the sheets of special paper to be inserted will be an integral multiple of the number of the sheets of special paper constituting one set. Furthermore, if the insertion position can be designated according to the tab paper constituting one set, it is also preferable to include the requirement that the number of the sheets of each tab paper to be inserted should be the same.

To enable designation of the page position with one set as a unit, "A" input columns are preferably provided on the page position input screen 200 where the number of the sheets of special paper constituting one set is assumed as "A". It is also possible to make such arrangements that an "OK" button to determine the setting contents appears only when "A" insertion positions or insertion positions in multiples of "A" have been designated, or the operation of the "OK" button is enabled only when "A" insertion positions or insertion positions in multiples of "A" have been designated.

The print data transmitting apparatus 100 can also be arranged as a printer driver installed and run by the personal computer and similar equipment. Before the number of the sheets of special paper constituting one set is set, a predetermined initial value may be the same as the number of the sheets constituting one set. If setting has not yet performed and the number of the sheets of special paper constituting one set is indeterminate, it is also possible to arrange such a configuration that the operation for designating the page position where the special paper is inserted in the printed material is disabled.

As described above, designation of the page position where special paper is inserted into a printed material is received based on a set of special paper defined as one unit, thereby permitting printing conditions to be set free of excess special paper.

DETAILED DESCRIPTION OF THE PREFERRED EMBODIMENT

Figure 1:
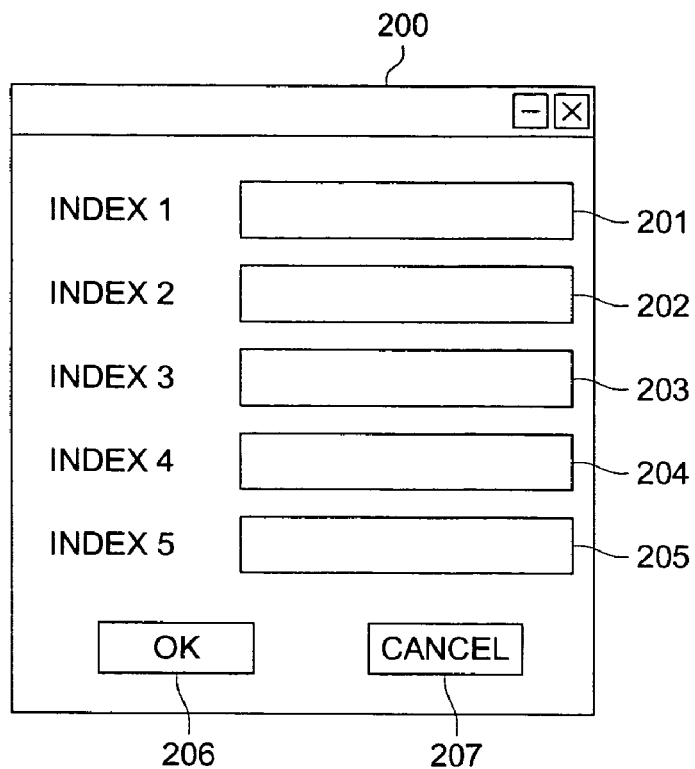
FIG. 1 is a diagram representing an example of the page position input screen displayed by a print data transmitting apparatus as an embodiment of the present invention.

The aforementioned problems can be solved by the following aspects of the invention:

(2) A print data transmitting apparatus 100 for transmitting print data to an image forming apparatus 10 having a function of creating a printed material including a plurality of pages by inserting a plurality of sheets of special paper constituting one set into a predetermined position one by one, wherein this print data transmitting apparatus 100 includes;

a number-of-constituent sheets acquiring section 101, 210 for acquiring the number of sheets of special paper constituting one set;

an insertion information inputting section (102, 200) for receiving designation of the page position where special paper is inserted in the printed material; and a guiding section 102 for guiding a user to ensure that one or more sets of sheets of special paper, where each set consists of a plurality of sheets, are used without producing an excess, when the insertion information inputting section (102, 200) receives the aforementioned designation.

The input data transmitting apparatus described in the aforementioned item 2 leads a user to ensure that one or more sets of sheets of special paper are used without producing any excess, when receiving the designation of the page position where special paper is inserted into a printed material. Any method may be used to lead the user; visual or audio guidance method may be used. For example, "An" input columns should be provided on the page position input screen 200 where the number of the sheets of special paper constituting one set is assumed as "A". This can lead the user to make sure that the number of sheets to be inserted is "A". It is also possible to lead the user by arranging such a configuration that the adequate number "A" of sheets to be inserted is indicated on the page position input screen 200; the number of remaining inputs required to ensure that the number of inserted sheets becomes a multiple of "A" is sequentially displayed thereon; or the OK button is displayed to determine the contents of setting only when the number of inserted sheets has reached a multiple of "A".

(3) The print data transmitting apparatus 100 described in the aforementioned item 1 or 2, further containing a warning section 104, 290 for issuing a warning to restart designation of the insertion position, if the number of the sheets of special paper constituting one set has been modified after receipt of designation of the insertion position by the aforementioned insertion information inputting section.

The input data transmitting apparatus described in the aforementioned item 3 issues a warning to restart designation of the insertion position, if the number of the sheets of special paper constituting one set has been changed. Any method may be used to issue this warning; a visual warning method by displaying a message of warning, or a visual warning method by issuing a warning sound may utilized.

(4) The print data transmitting apparatus 100 described in the aforementioned item 1, 2 or 3 further containing a re-input forcing section 105 that forces designation of the insertion position to be restarted by the aforementioned insertion information inputting section (102, 200), when the number of the sheets of special paper constituting one set has been changed after receipt of designation of the insertion position by the insertion information inputting section (102, 200).

The input data transmitting apparatus described in the aforementioned item 4 allows the re-input forcing section 105 to force designation of the insertion position to be restarted by the user when the number of the sheets of special paper constituting one set has been changed. For example, re-setting is forced by automatic display of the page position input screen 200 for insertion of special paper. This arrangement ensures print setting free of excess special paper, even when the number of the sheets of special paper constituting one set has been changed after receipt of designation of the insertion position.

Before forcing the designation of the insertion position to be restarted, it is good practice to issue a warning message notifying the need of restarting the designation. When receiving forcible resetting of the insertion position, the page position having received prior to the change in the number of the sheets of special paper constituting one set is reflected on the input screen for resetting as an initial value; then a change or addition to that value is received. This arrangement reduces the operation load at the time of resetting.

(5) The print data transmitting apparatus 100 described in the aforementioned item 1, 2, 3 or 4, wherein the page position is designated on the input screen 200 containing the input columns for designation of the page position, in the same number as that of the sheets of special paper constituting one set or in a multiple of that number.

The input data transmitting apparatus described in the aforementioned item 5 allows the input screen 200 for receive designation of the page position to display the input columns for designation of the page position, in the same number as that of the sheets of special paper constituting one set or in a multiple of that number. This arrangement permits the user to recognize the adequate number of sheets to be inserted intuitively, and leads the user to determine the setting free of excess sheets.

(6) An image forming system 5 containing an image forming apparatus 10 having a function of creating a printed material including a plurality of pages by inserting a plurality of sheets of special paper constituting one set one by one into the designated page position one by one; and an print data transmitting apparatus 100 described in any one of (1) through (5).

The invention according to the aforementioned item 6 provides an image forming system 5 that allows the insertion position to be designated so as to avoid generation of excess special paper prior to start of printing.

(7) A printer driver program for allowing a computer to perform the functions of the print data transmitting apparatus 100 described in the aforementioned item 1, 2, 3, 4 or 5.

(8) A print condition setting method for transmitting print data to an image forming apparatus 10 having a function of creating a printed material including a plurality of pages by inserting a plurality of sheets of special paper constituting one set into a predetermined position one by one, wherein designation of the page position for insertion of special paper into a printed material is received, with the insertion position for one set of special paper assumed as a unit.

Designation of the page position can be received through a computer apparatus as a source for sending print data, a print driver or an operation panel of the image forming apparatus 10.

(9) A print condition setting method for transmitting print data to an image forming apparatus 10 having a function of creating a printed material including a plurality of pages by inserting a plurality of sheets of special paper constituting one set into a predetermined position one by one, wherein the designation of the page position for insertion of special paper into a printed material is received while a user is led to use one or more sets of sheets of special paper where each set consists of a plurality of sheets, without allowing any excess set to be generated.

The input data transmitting apparatus, image forming system, print condition setting method and print driver of the present invention receives the designation of the page position for insertion of special paper into a printed material, with one set of special paper assumed as a unit. This arrangement eliminates the possibility of generating excess special paper, and prevents printing failure, thereby avoiding wastage of paper resource, hence providing environmental advantages.

If the user is led to use up one or more sets of special paper without allowing an excess paper to be generated when receiving the designation of the page position for insertion of special paper into a printed material, the user need not be conscious of the number of sheets in one set. This arrangement reduces the user's operation load and allows the user to set the adequate number of sheets to be inserted.

In a system where a warning is issued to restart designation of the insertion position when there is a change in the number of special paper constituting one set after receipt of the subsequent to designation of the insertion position, the user is urged to restart setting; this arrangement prevents excess special paper from being produced.

In a system that forces the user to restart designation of the insertion position when there is a change in the number of special paper constituting one set after receipt of the subsequent to designation of the insertion position, the possibility of producing excess special paper is completely eliminated.

In a system that receives the designation of page position through the input screen having the input columns in the same number as that of the sheets of special paper constituting one set or in a multiple of that number, the user recognizes the adequate number of sheets to be inserted intuitively; thus, this arrangement improves maneuverability and convenience.

Preferred Embodiment

Figure 2:
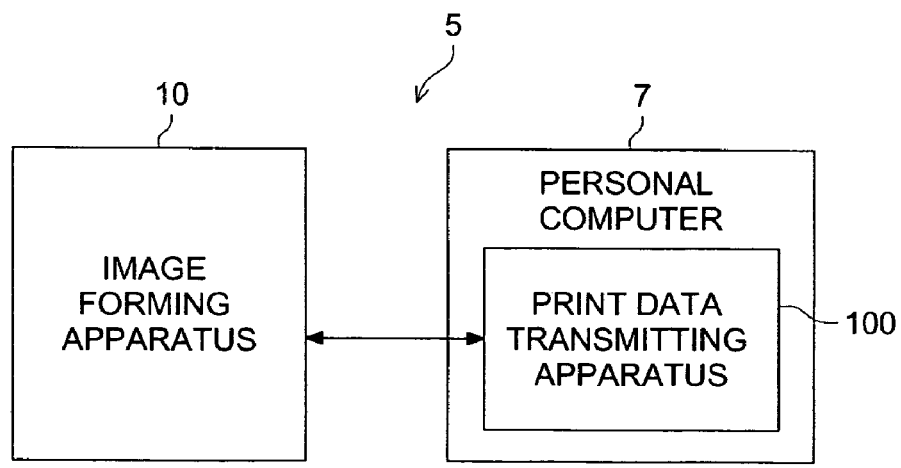
FIG. 2 is a block diagram representing the configuration of an image forming system as an embodiment of the present invention.

The following describes the embodiment of the present invention with reference to the drawings:

FIG. 2 shows the configuration of the image forming system 5 as an embodiment of the present invention. The image forming system 5 consists of an image forming apparatus 10 and input data transmitting apparatus 100. The image forming apparatus 10 is provided with a scanning function of scanning the document image, a copying function of scanning the document, forming the copy on the recording paper and outputting it, and a facsimile function of exchanging image data with a remote apparatus. It is commonly called a digital multifunctional apparatus.

Figure 10:
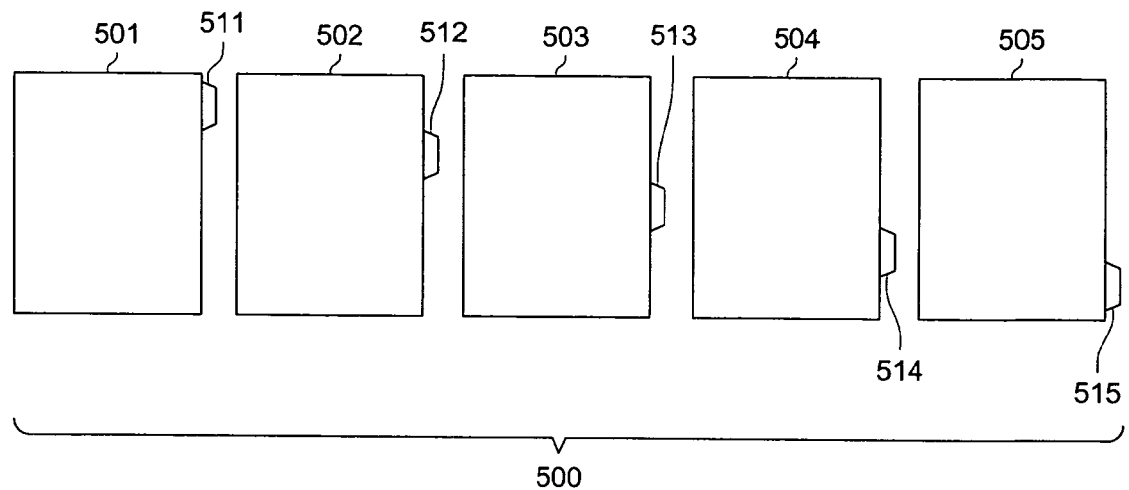
FIG. 10 is an explanatory diagram showing an example of a set of tab paper consisting of five sheets.
Figure 11:
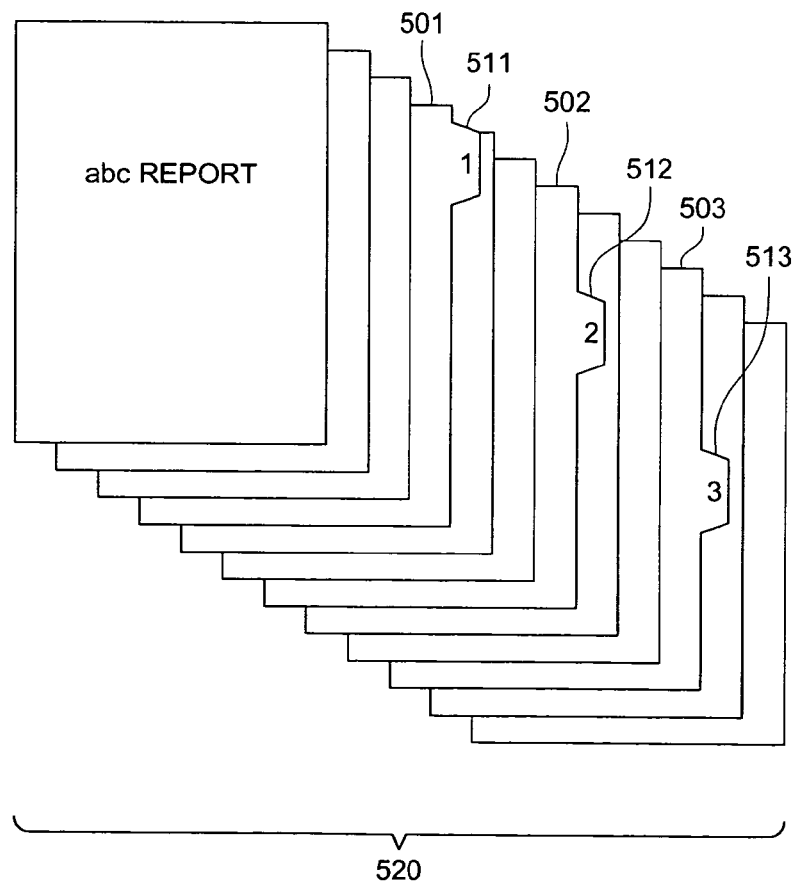
FIG. 11 is an explanatory diagram showing an example of the printed material with three sheets of tab paper inserted between the pages.

The image forming apparatus 10 is also provided with a function of inserting such special paper (facilitating material) as tab paper shown in FIG. 10, into the page position designated by the user and creating a printed material shown in FIG. 11. The embodiment will be described with reference to the case of using tab paper as a special paper (facilitating material).

The print data transmitting apparatus 100 has a function of sending the print data created by a document creating software or a similar tool, to such a printer as image forming apparatus 10. Here the function of the print data transmitting apparatus 100 is performed by running a printer driver installed on a personal computer 7. The personal computer 7 containing the print data transmitting apparatus 100 is connected with the image forming apparatus 10 via the network such as a LAN (Local Area Network).

Figure 3:
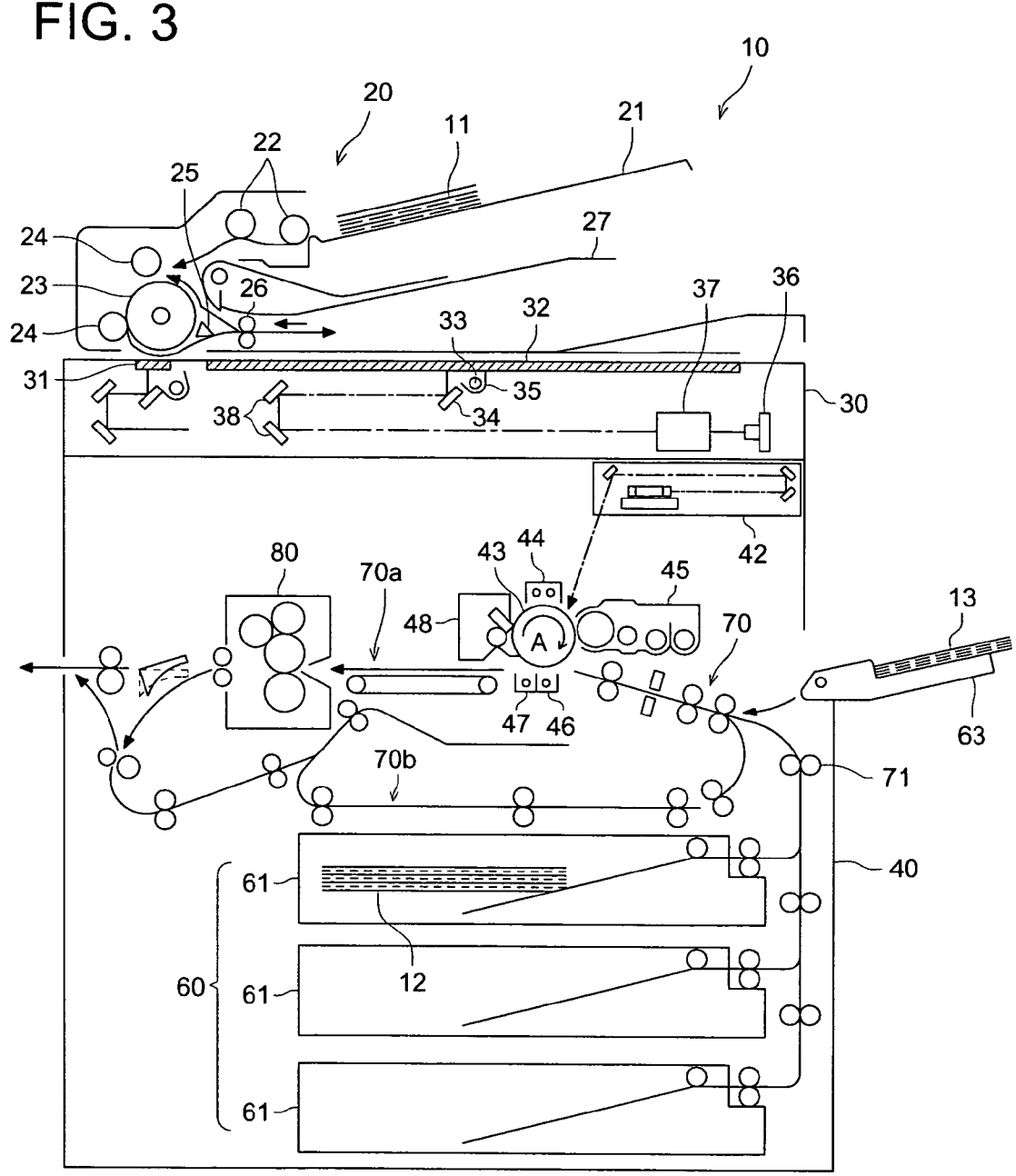
FIG. 3 is a cross sectional view showing an image forming apparatus contained in an image forming system as an embodiment of the present invention.

FIG. 3 is a cross sectional view showing an image forming apparatus 10. The image forming apparatus 10 comprises an automatic document feed apparatus 20, a scanner 30 and a printer 40. The automatic document feed apparatus 20 has a function of sending the documents 11 placed on a document tray 21, one by one to the reading position of the scanner 30. It has a function of reversing a double sided document after one side has been scanned and sending it to the scanner 30.

The scanner 30 has the function of scanning the document sent by the automatic document feed apparatus 20 and outputting the corresponding image. The scanner 30 comprises an exposure scanning section 35 further consisting of a light source 33 and a mirror 34;

a line image sensor 36 for receiving the light reflected from the document and outputting electric signal conforming to the light intensity; a condensing lens 37 for condensing the light reflected from the document, to the line image sensor 36; and various mirrors 38 to create an optical path for leading the light reflected from the exposure scanning section 35 and mirror 34, the line image sensor 36.

Using electrophotographic technology, the printer 40 forms on the recording paper the image data obtained by scanning the document by the scanner 30 or the image conforming to the image data obtained by unfolding the print data received from the personal computer 7, on the raster image. To be more specific, the printer 40 is configured as a laser printer based on electrophotographic technology.

The image is formed as follows: The photoconductor 43 rotates in a fixed direction (arrow-marked direction "A" in the figure), and the surface is electrically charged by a charging device 44 in a uniform manner. The laser unit 42 applies the laser beam that is turned on or off in conformity to the image data, to the surface of the photoconductor 43 having been subjected to electric charging. The electrostatic latent image formed on the surface is made visible by a development apparatus 45 using toner.

This toner image is transferred onto the recording paper fed from a paper feed section 60 to be described later, by means of a transfer apparatus 46. The recording paper with toner image transferred thereon is separated from the photoconductor 43 by a separator 47. When the recording paper passes by the fixing apparatus, toner image is fixed on it and is ejected. The toner remaining on the surface of the photoconductor 43 after transfer is removed and collected by a cleaning apparatus 48.

The paper feed section 60 contains a plurality of paper feed cassette 61 and a manual tray 63, and has a function of feeding the sheets stored or accumulated in these devices one by one. The paper feed cassette 61 stores the recording paper 12 of a regular size such as A4 or B4 paper, while the manual tray 63 is used to feed the sheets of special size or thickness. Tab paper 13 is normally fed from the manual tray 63.

The conveyance section 70 consists of:

a regular path 70a that allows such a sheets as recording paper 12 or tab paper 13 fed out of the paper feed cassette 61 or manual tray 63 to pass through the transfer position located between the photoconductor 43 and transfer apparatus 46, and permits such sheets to be ejected to the ejection tray outside the apparatus through a fixing apparatus 80 located downstream therefrom; and a reversing path 70b that reverses the sheets having passed through the fixing apparatus 80 and feeds them through regular path 70a again upstream from the transfer position. The paths 70a and 72b are provided with multiple conveyance rollers 71 arranged at an interval smaller than the size of the transfer paper of the minimum size in the feed direction.

The image forming apparatus 10 recognizes that the sheet being conveyed is tab paper 13 when forming an image on the tab paper 13. It is designed to ensure that mis-detection of jamming will not be caused by the presence of a tab.

Figure 4:
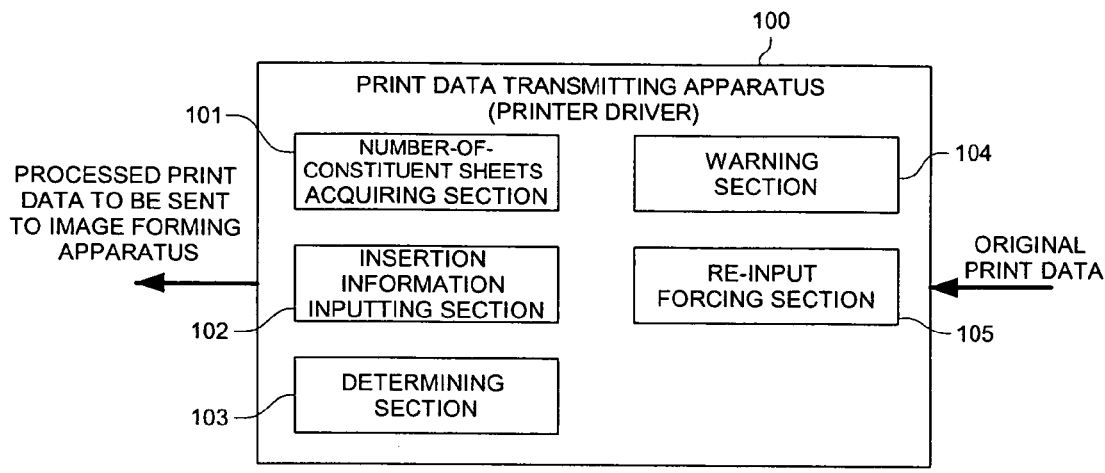
FIG. 4 is a block diagram representing the configuration of the function of the print data transmitting apparatus as an embodiment of the present invention.

FIG. 4 shows the configuration of the function of the print data transmitting apparatus 100. In addition to the general function as a printer driver of adding various types of control information to the print data created by document creating software or a similar tool and sending it to the image forming apparatus 10, the print data transmitting apparatus 100 has various functions related to such insertion paper as tab paper. The number-of-constituent sheets acquiring section 101 performs a function of acquiring the number of the sheets constituting one set. The present embodiment is so configured that a tab paper setting screen 210 is displayed on the display apparatus of the personal computer 7 and the number of the sheets constituting one set (number of indexes) is received from the user through this tab paper setting screen 210.

The insertion information inputting section 102 receives the designation of the page position for insertion of tab paper into a printed material, from the user. When this operation is performed, the insertion positions in the same number as that of the sheets of special paper (facilitating material) constituting one set are used as an input unit. To put it more specifically, the designation of page position is received through the page position input screen 200 containing the input columns in the same number as that of the sheets constituting one set. Furthermore, when receiving designation of page position, the insertion information inputting section 102 serves the function as guiding means that leads the user to utilize one or more sets of sheets of special paper (facilitating material) without excess.

A determining section 103 determines whether or not the contents of the setting related to insertion of the tab paper inputted through the through the insertion information inputting section 102 are intended to ensure use of one or more sets of tab paper without excess. It also determines whether or not there is any contradiction in the dimensions of the page position set for each of the sheets of tab paper constituting one set.

When the result of the operation of the determining section 103 indicates generation of excess tab paper or presence of contradiction in the dimensions of the page position, the warning section 104 warns the user before start of printing operation. In this case, a warning screen 270 to be described later is indicated on the display apparatus of the personal computer 7, thereby warning the user. The warning section 104 performs the function of issuing a warning to restart designation of the insertion position, if there is any change in the number of the sheets of special paper (facilitating material) constituting one set after receipt of the designation of insertion position through the insertion information inputting section 102.

The re-input forcing section 105 forces the user to restart the designation of the insertion position if there is any change in the number of the sheets of special paper (facilitating material) constituting one set after receipt of the designation of insertion position through the insertion information inputting section 102. To put it more specifically, page position input screen 200 is automatically indicated to prompt the user to restart inputting.

Figure 5:
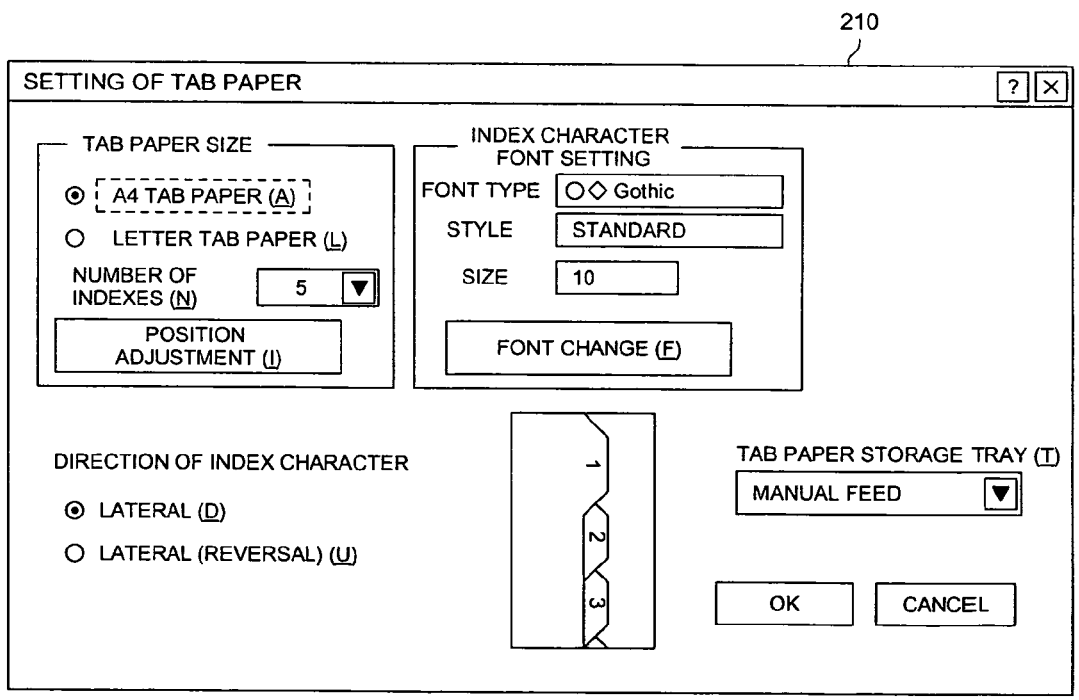
FIG. 5 is an explanatory diagram showing an example of the tab paper setting screen displayed by the print data transmitting apparatus as an embodiment of the present invention.

FIG. 5 shows an example of the tab paper setting screen where the number of the sheets of tab paper constituting one set (number of indexes) is set. The tab paper setting screen 210 makes it possible to select the size of tab paper, number of the sheets of tab paper constituting one set (number of indexes), the type and size of the font of the index character to be printed on the tab, the direction of the index character, and the tray of the tab paper feed source (storage tray). The number of the sheets of tab paper constituting one set (number of indexes) can be selected in the range from 3 through 9. The standard value (default value) is "5". FIG. 5 shows the state where the number of the sheets of tab paper constituting one set (number of indexes) is set to "5".

Figure 6:
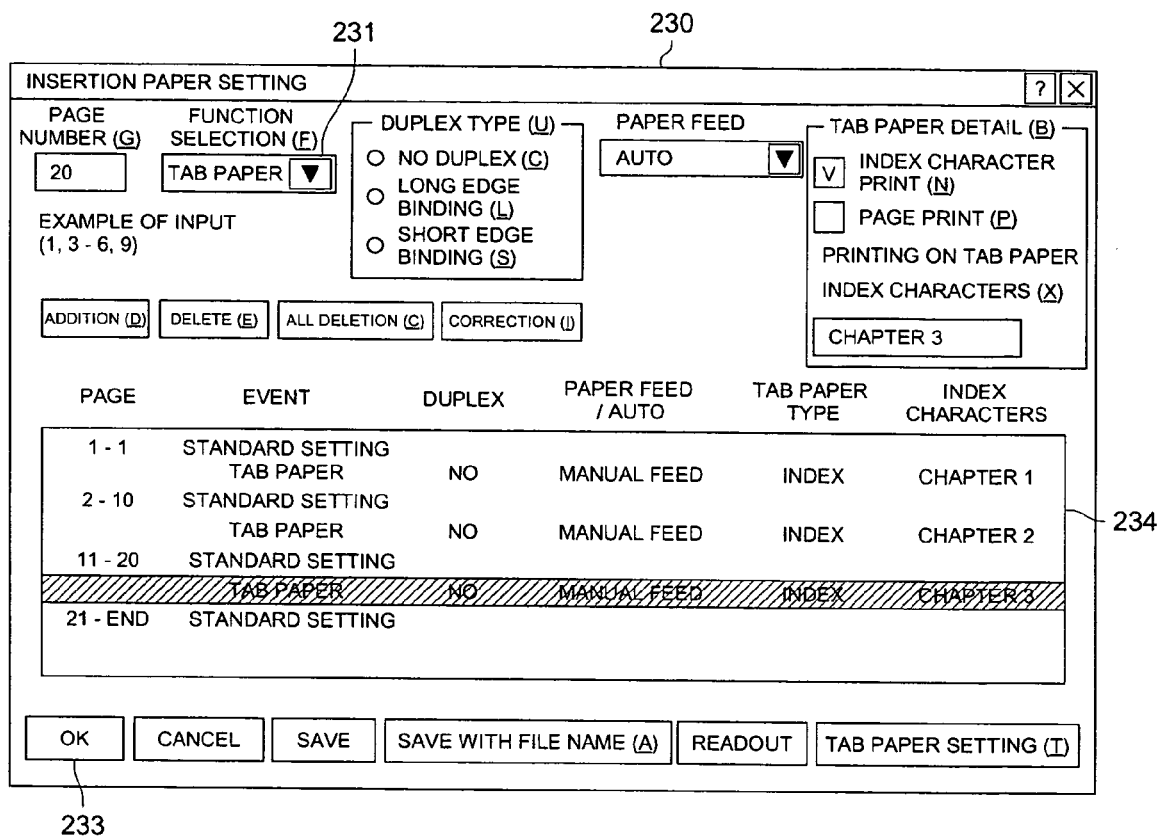
FIG. 6 is an explanatory diagram showing an example of the insertion paper setting screen displayed by the print data transmitting apparatus as an embodiment of the present invention.

FIG. 6 shows an example of the insertion paper setting screen 230 where various types of settings related to insertion paper are performed. The insertion paper setting screen 230 shows information on insertion such as the range of the pages, the type of the recording paper, the mode of printing (duplex or simplex) and the source of paper feed. The contents of settings are given in the insertion information display column 234 on the lower portion of the screen. Furthermore, if the "tab paper setting" button 232 on the lower portion of the screen is operated, the tab paper setting screen 210 of FIG. 5 will appear.

The "function select" column 231 has a function of receiving the type of the paper to be inserted. Alternatives such as blank paper and tab paper are provided for selection. "NO" insertion position is indicated in terms of the default value in the "function select" column 231. If the user has selected "tab paper" from the pull down menu of the "function select" column 231, the page position input screen 200 shown in FIG. 1 appears. Here the window for page position input screen 200 opens again. The page position input columns in the same number as that of the indexes (the number of the sheets of tab paper constituting one set) are indicated on the page position input screen 200. FIG. 5 shows an example of the page position input screen 200 displayed when the number of indexes is "5". There are first to fifth input columns 201 through 205.

Incidentally, it is also preferable to display, as the number of indexes, the integral multiple of the number of the sheets based on information about the number of sheets of special paper ("5" in this case) constituting one set.

The first input column 201 is the input column for inputting the insertion position (numeral indicating the page position) of the first sheet on its ordinal position of arrangement (tab paper 511 in FIG. 10) in the sheets of tab paper constituting one set. The character string of "Index 1" indicating the name of this column is displaced at the adjacent site. The second input column 202 is the input column corresponding to the second tab paper. It has a character string of "Index 2". Similarly, the third input column 203 is the input column corresponding to the third tab paper. It has a character string of "Index 3". The fourth input column 204 is the input column corresponding to the fourth tab paper. It has a character string of "Index 4". The fifth input column 205 is the input column corresponding to the fifth tab paper. It has a character string of "Index 5".

The OK button 206 is the button to be operated by the user when closing the page position input screen 200 by determining the contents of input into the first to fifth input columns 201 through 205. The Cancel button 207 is the button to be operated by the user when closing the page position input screen 200 by canceling without determining the contents of input into the first to fifth input columns 201 through 205.

Figure 7:
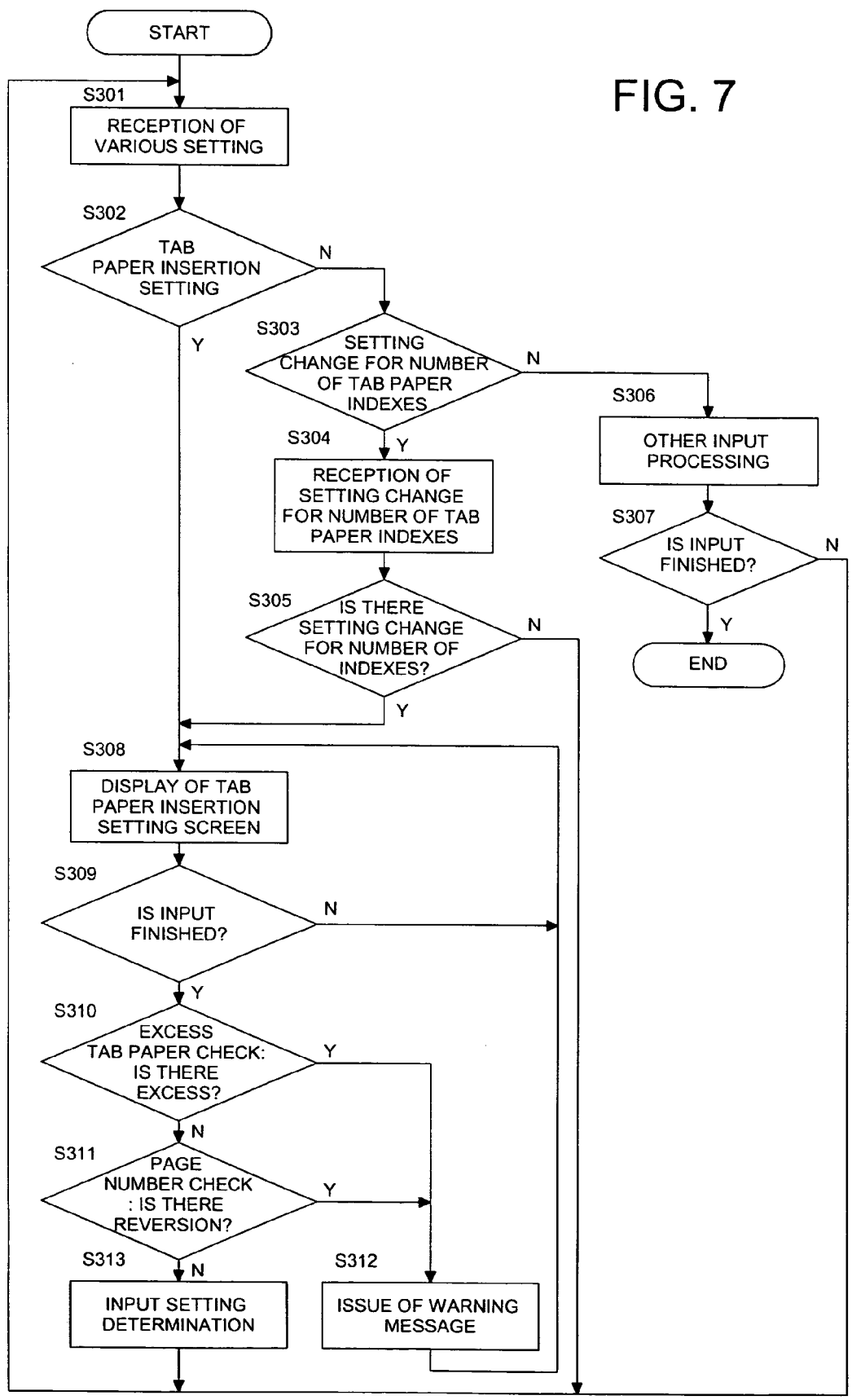
FIG. 7 is a flowchart showing the processing of tab paper insertion setting to be applied by the print data transmitting apparatus as an embodiment of the present invention.

FIG. 7 shows the flow of the processing related to insertion setting of the tab paper. In the insertion paper setting screen 230 of FIG. 6, the user operates the setting of various printing conditions related to insertion of tab paper or the like (Step S301). If this setting includes the message of selecting tab paper in the "function select" column 231 of the insertion paper setting screen 230 (Step S302;Y), it is indicated on the page position input screen 200 of FIG. 1 (Step S308).

After the number of indexes of the default value has been set or the number of indexes has been set on the tab paper setting screen 210, the page position input columns 201 through 205 in the same number as that number are displayed on the page position input screen 200. This arrangement makes it easy for the user to identify the number of the sheets of tab paper constituting one set. Furthermore, by displaying the page position input columns 201 through 205 in the same number as that of the indexes, the user is led to ensure the setting so that excess tab paper will not be generated. A plurality of page positions can be inputted in one input column by using commas to separate numerals in the page position input columns 201 through 205.

When the user having completed inputting has pressed the OK button 206 of the page position input screen 200 (Step S309;Y), evaluation is made to determine whether excess tab paper is produced or not, from the number of the insertion positions having been inputted and the number of the sheets of tab paper constituting one set (Step S310). To be more specific, assume that the total number of the insertion positions for the tap paper set on the page position input screen 200 (the number of sheets to be inserted) is N, and the number of the sheets of tab paper constituting one set on the tab paper setting screen 210 (number of indexes) is M. Then if N is a multiple of M, evaluation is made to determine that there is no excess tab paper. If not, evaluation is made to determine that there is excess tab paper. Furthermore, a check is made to determine if the numbers of the insertion positions having been inputted in each of the first to fifth input columns 201 through 205 are the same with each other or not. If the numbers are not the same, this case is handled in the same manner as when excess tab paper is generated.

Figure 8:
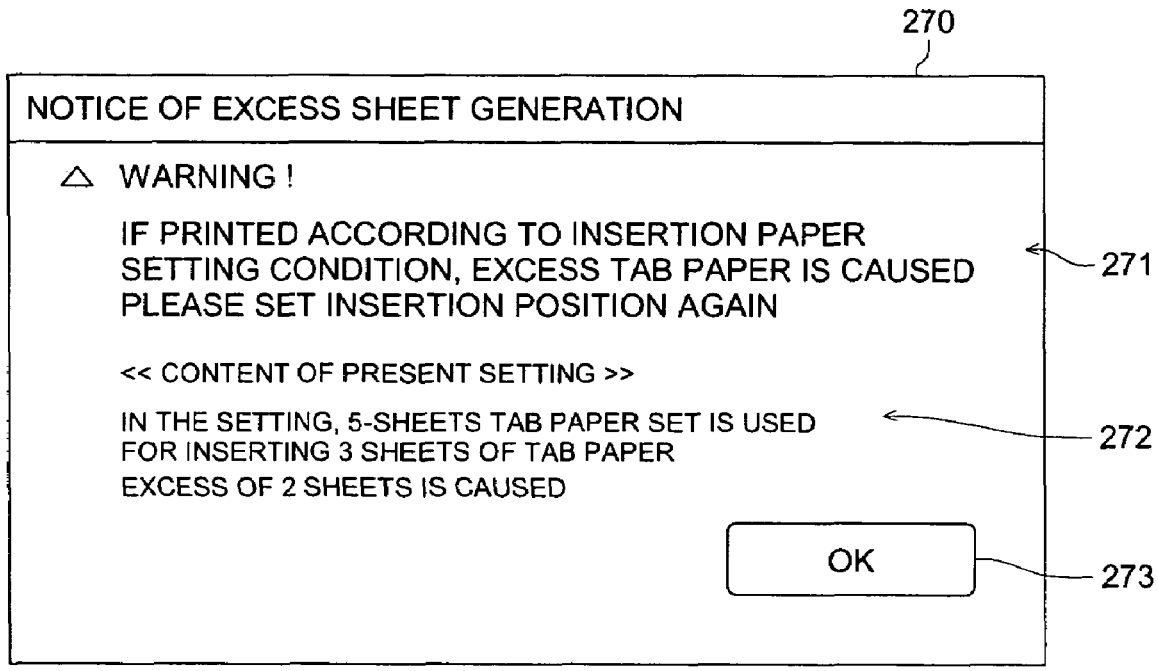
FIG. 8 is an explanatory diagram showing an example of the warning screen displayed by the print data transmitting apparatus as an embodiment of the present invention.

If excess tab paper is generated (Step S310;Y), the warning screen 270 shown in FIG. 8 is popped up to warn the user of excess tab generation (Step S312). The warning screen 270 shown in FIG. 8 contains a warning message 271 indicating the generation of excess tab and the need of re-setting the insertion position, the detailed information 272 showing the detailed information on the number of excess sheets of tab paper to be generated, and an OK button 273 for receiving operation to verify the contents of warning. If the OK button 273 is pressed to show that the warning has been confirmed, the system goes back to Step S308 to receive a new designation of the tap paper insertion position.

If there is no generation of excess tab paper (Step S310; N), verification is made to see whether or not there is any contradiction in the dimensions of the page positions inputted in the first through fifth input columns 201 through 205. If there is any (Step S311;Y), a message to that effect is displayed (Step S312). Then the system goes back to (Step S308) to receive a new designation of the page position for insertion of tab paper. For example, when the number of the tab paper indexes is "5", the page positions for insertion must be configured in such a way as to meet the requirements in the relation of magnitude; index 1<index 2<index 3<index 4<index 5<index 1<index 2< . . . , and confirmation is made to check this relationship.

If there is no generation of tab paper (Step S310; N) and there is no contradiction in the relation of magnitude in page positions (Step S311; N), the contents of the setting inputted on the page position input screen 200 is determined (Step S313).

When the tab paper setting button 232 has been operated by the user on the insertion paper setting screen 230 (Step S302; N, S303;Y), the system receives changes in the setting of the number of the sheets of tab paper constituting one set and others through the tab paper setting screen 210 (Step S304). When the number of indexes has been changed (Step S305; Y), the system goes to Step S308 to display the page position input screen 200 automatically, and forces the user to re-set the page position for insertion of tab paper (Step S308).

When re-setting, it is preferred that the previously set data be reflected as a default value. To be more specific, it is preferred that the input screen where the previously set page positions should be assigned to the indexes subsequent to change in the ascending order in advance is initially displayed as the page position input screen 200 at the time of re-setting. For example, if the number of indexes with five pager positions being set has been changed from "5" to "4", the page positions set for "index 1" through "index 4" prior to change are displayed directly as the defaults values for page positions corresponding to the "index 1" through "index 4" subsequent to change. The page position set for the "index 5" prior to change is initially displayed as a second position in the "index 1" subsequent to change.

Figure 9:
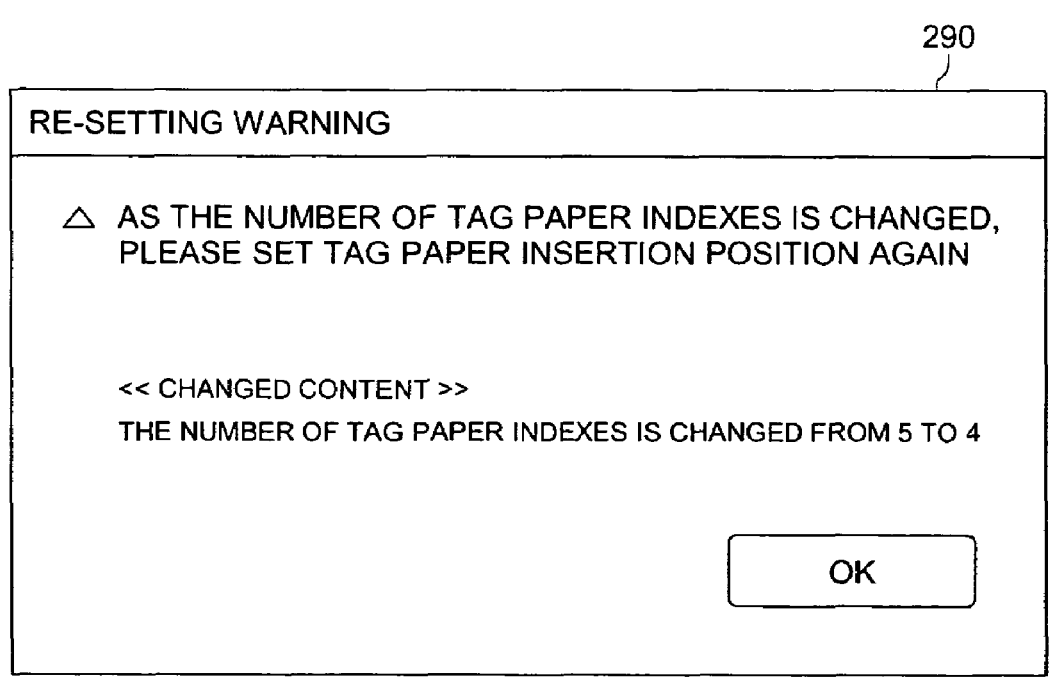
FIG. 9 is an explanatory diagram showing an example of the re-setting warning screen displayed by the print data transmitting apparatus as an embodiment of the present invention.

It is also possible to arrange such a configuration that a warning be issued to restart the designation of insertion positions, before re-setting is forced. For example, it is preferred that a re-setting warning screen 290 shown in FIG. 9 be indicated.

If the operation by the user on insertion paper setting screen 230 is otherwise (Step S303; N), the processing in conformity to the corresponding operation is performed (Step S306). If the OK button 233 on the insertion paper setting screen 230 has been pressed (Step S307; Y), the insertion paper setting screen 230 is closed to terminate the input-processing (END).

As described above, setting of tab paper is performed in such a way that excess tab paper does not occur, and therefore problems with excess tab paper have already been solved when the print data is sent to the image forming apparatus 10. This arrangement eliminates the need of providing the image forming apparatus 10 with a special function of removing excess tab paper. For the existing model not equipped with such a function, this arrangement solves the problems with excess tab paper.

The embodiments of the present invention have been described with reference to drawings. A specific configuration, however, is not restricted to these embodiments; a modification or addition without departing from the spirit of the present invention should be construed as being included in the present invention. In the number-of-constituent sheets acquiring section of the present embodiment, for example, the number of the sheets of tab paper constituting one set is set by the user using the tab paper setting screen 210 displayed on the display of the personal computer 210. It is also possible to arrange such a configuration that information on the number of the sheets constituting one set is received from the image forming apparatus 10.

To put it another way, it is also possible to make such arrangements that the image forming apparatus 10 is equipped with a sensor for detecting the number of the sheets of tab paper constituting one set. To be more concrete, it is possible to provide such a sensor above the paper supply tray for supplying tab paper. Further, the number of the sheets of tab paper constituting one set can be inputted from the operation panel of the image forming apparatus 10. Thus, the number of the sheets constituting one set is detected on the side of the image forming apparatus 10, and this information is received by the print data transmitting apparatus 100 from image forming apparatus 10.

In the above, at the insertion information inputting section, the example where the user sets the information by using the page position input screen 200 displayed on the display of the personal computer 7. Another arrangement is also possible where the user can input the information from the operation panel of the image forming apparatus 10.

Further, in the aforementioned embodiment, the example is described where the printer 40, the paper feed cassette 61 as the first paper feed means, and the manual tray 63 as the second paper feed means are provided at the image forming apparatus 10, and the print data transmitting apparatus 100 is provided at the computer 7, which is connected to the image forming apparatus 10. Though, the print data transmitting apparatus 100 can be also provided at the image forming apparatus 10. To put it more concretely, it is possible to make an arrangement such that the print data transmitting function of the print data transmitting apparatus is combined with the scanner 30, and the image data (print data) outputted from the scanner 30 is transmitted to the printer 40 to perform printing on the recording paper. Further it is also possible to make the print data transmitting apparatus 100 transmit the sending/receiving data (print data) from a memory means (not illustrated) memorizing the sending/receiving data for the use of facsimile function to the printer 40, and allow the printing on the recording sheet based on the data.

In the aforementioned embodiment, arrangement is made to ensure that a plurality of page positions can be set up by using commas to separate them, in the page position input columns 201 through 205 displayed on the page position input screen 200. However, means can be provided to ensure that one page position can be set in one page position input column. In this case, it is also possible to ensure that page positions corresponding to a further set can be inputted by operating the Addition button.

Further, in the aforementioned embodiment, the position information regarding the position, where the special paper is to be inserted, is set at the input column displayed in the page position input screen 200, and after the setting, when "OK" button 206 is selected a judgment whether excess tab paper is generated or not is conducted, then, if excess tab paper is generated the warning screen 270 is displayed. It is also possible to make such arrangement that before selecting the "OK" button, the judgment whether excess tab paper is generated or not is conducted as needed, at the stage when the position information regarding the position, where the special paper is to be inserted, is set at the input column displayed in the page position input screen 200, and in case that excess tab paper is generated, to provide means to ensure that the OK button 206 is not displayed on the page position input screen 200 when excess tab paper occurs.

In this way at the time of inputting the insertion position information, by making the arrangement such that only the number of input is allowed which coincides with the integral multiple of the number of constituent sheets of the special paper, generation of excess special paper is surely prevented. In any case, inputting of the position information is completed only when the number of input settings coincides with the integral multiple of the number of constituent sheets of the special paper.

It is also possible to make such arrangements that the designation of page position is received where the insertion positions for one set of sheets of special paper are used as an input unit; in addition, or alternatively, means are provided to lead the user to utilize one or more sets of sheets of special paper without excess, when receiving designation of the page position for insertion of special paper in the printed material.

For example, "A" input columns are preferably provided on the page position input screen where the number of the sheets of special paper constituting one set is assumed as "A". This arrangement leads the user to utilize paper without excess, when receiving designation of the page position for insertion of special paper in the printed material. It is also possible to make following arrangements to lead the user: The adequate number (A) of sheets to be inserted is displayed when receiving designation of the page position; the number of inputs required to reach the adequate number of inputs is counted down and is displayed; or the OK button for determining the settings is displayed only when the number of inputs at the insertion position is an integral multiple of "A".

It is also preferable to lead the user not to generate the excess tab paper by making such arrangement that the number of integral multiple of the number of constituent sheets of special paper is displayed on the page position input screen 200 where input column for setting the insertion position information is displayed, based on the information of number of constituent sheets of one special paper set.

Further, in the aforementioned embodiment, example of the arrangement where the printed material is formed by inserting the special paper such as tab paper at the designated page by the user. The present invention is not restricted to this arrangement, and another arrangement is also possible where printed material is obtained based on plural kinds of print data and the special paper is inserted between the plural kinds of print data.

In the aforementioned embodiment, the tab paper is exemplified as the special paper. The present invention is not restricted to this, and such special paper as a color paper constituting one set with plural colors of sheets is applicable. Further as the special paper, the set of tab paper constituted with plural sheets is exemplified, however, the special paper is not restricted to this, but plural sheets of tab paper having the same tug position can also be applicable. In this case, number of constituent sheets is 1, and no excess tab paper can be generated.

What is claimed is:

1. An image forming system for obtaining printed material with facilitating material for accessing to specific pages or areas of the printed material, the image forming system comprising:
   a first feeding section for feeding a recording sheet;
   a second feeding section for feeding the facilitating material;
   a first input section for obtaining a number of sheets constituting one set of the facilitating material loaded on the second feeding section;
   a second input section for receiving position information with regard to a position where the facilitating material is added into the printed material;
   a transmitting section for transmitting print data;
   a printing section for recording an image on the recording sheet based on the print data;
   wherein the second feeding section feeds the facilitating material based on the position information, and the image forming system guides an input of the position information based on the number of sheets constituting one set of the facilitating material; and
   wherein the image forming system further comprises:
   a display section for displaying input areas for the position information, wherein a number of the input areas is equal to an integral multiple of the number of the sheets constituting one set of the facilitating material;
   a judging section which judges whether a number of positions of the position information set in the input areas is equal to the integral multiple of the number of sheets constituting one set of the facilitating material, after the position information is set in the input areas; and
   an urging section which urges a user to rework the input operation of the position information, when the number of positions of the position information set in the input areas is not equal to the integral multiple of the number of sheets constituting one set of the facilitating material,
   wherein the urging section displays a rework message and the input areas for the position information, and a number of the input areas is equal to at least the number of sheets constituting one set of the facilitating material lastly obtained by the first input section.

2. The image forming system of claim 1, further comprising:
   an image forming apparatus; and
   a computer system electrically connected with the image forming apparatus, wherein the printing section, the first feeding section and the second feeding section are provided in the image forming apparatus, and the transmitting section is provided in the computer system.

3. The image forming system of claim 2, wherein the first input section is provided in the computer system.

4. The image forming system of claim 2, wherein the first input section is provided in the image forming apparatus.

5. The image forming system of claim 4, wherein the first input section is provided in the second feeding section of the image forming apparatus.

6. The image forming system of claim 4, wherein the first input section is provided on an operation panel of the image forming apparatus.

7. The image forming system of claim 1, wherein the second input section is provided in the computer system.

8. The image forming system of claim 4, wherein the second input section is provided in the image forming apparatus.

9. The image forming system of claim 7, wherein the second input section is provided on an operation panel of the image forming apparatus.

10. The image forming system of claim 2, wherein the urging section urges the user to rework the input operation of the position information by using the second input section, when the number of the sheets constituting one set of the facilitating material is changed after the second input section received designation of the position information.

11. The image forming system of claim 1, further comprising an image forming apparatus, wherein the printing section, the first feeding section, the second feeding section and the transmitting section are provided in the image forming apparatus.

12. The image forming system of claim 1, wherein the one set of the facilitating material placed on the second feeding section comprises a plurality of facilitating materials.

13. The image forming system of claim 1, wherein the urging section urges the user to rework the input operation of the position information by using the second input section, when the number of the sheets constituting one set of the facilitating material is changed after the second input section received designation of the position information.

14. An image forming system for obtaining printed material with facilitating material for accessing to specific pages or areas of the printed material, the image forming system comprising:
   a first feeding section for feeding a recording sheet;
   a second feeding section for feeding the facilitating material;
   a first input section for obtaining a number of sheets constituting one set of the facilitating material loaded on the second feeding section;
   a second input section for receiving position information with regard to a position where the facilitating material is added into the printed material;
   a transmitting section for transmitting print data;
   a printing section for recording an image on the recording sheet based on the print data;
   wherein the second feeding section feeds the facilitating material based on the position information, and the image forming system guides an input of the position information based on the number of sheets constituting one set of the facilitating material;
   wherein input areas and numerical characters of an integral multiple of the number of sheets constituting one set of the facilitating material are displayed in accordance with the number obtained by the first input section; and wherein the image forming system further comprises:

a judging section which judges whether a number of positions of the position information set in the input areas is equal to the integral multiple of the number of sheets constituting one set of the facilitating material, after the position information is set in the input areas; and an urging section which urges a user to rework the input operation of the position information, when the number of positions of the position information set in the input areas is not equal to the integral multiple of the number of sheets constituting one set of the facilitating material, wherein the urging section displays a rework message and the input areas for the position information, and a number of the input areas is equal to at least the number of sheets constituting one set of the facilitating material lastly obtained by the first input section.

15. An image forming method for obtaining printed material with facilitating material for accessing to specific pages or areas of the printed material, the image forming method comprising:

feeding a recording sheet;
feeding the facilitating material;
obtaining a number of sheets constituting one set of the facilitating material;
receiving position information with regard to a position where the facilitating material is added into the printed material;
guiding an input of the position information based on the number of sheets constituting one set of the facilitating material;
transmitting print data to an image forming section, wherein the print data includes the position information; and
printing an image on the recording sheet based on the print data, at the image forming section;
wherein feeding the facilitating material is conducted based on the position information; and
wherein the image forming method further comprises:
displaying input areas for the position information, wherein a number of the input areas is equal to an integral multiple of the number of the sheets constituting one set of the facilitating material;
judging whether a number of positions of the position information set in the input areas is equal to the integral multiple of the number of sheets constituting one set of the facilitating material, after the position information is set in the input areas; and
when the number of positions of the position information is not equal to the integral multiple of the number of sheets constituting one set of the facilitating material, urging a user to rework the input of the position information by displaying a rework message and the input areas for the position information, wherein a number of the input areas is equal to at least the number of sheets constituting one set of the facilitating material as lastly obtained.

16. The image forming method of claim 15, further comprising when the number of the sheets constituting one set of the facilitating material is changed after reception of designation of the position information, urging the user to rework the input operation of the position information.

17. An image forming method for obtaining printed material with facilitating material for accessing to specific pages or areas of the printed material, the image forming method comprising:

feeding a recording sheet;
feeding the facilitating material;
obtaining a number of sheets constituting one set of the facilitating material;
receiving position information with regard to a position where the facilitating material is added into the printed material;
guiding an input of the position information based on the number of sheets constituting one set of the facilitating material;
transmitting print data to an image forming section, wherein the print data includes the position information; and
printing an image on the recording sheet based on the print data, at the image forming section;
wherein feeding the facilitating material is conducted based on the position information; and
wherein the image forming method further comprises:
displaying input areas for the position information and numerical characters of an integral multiple of the number of sheets constituting one set of the facilitating material;
judging whether a number of positions of the position information is equal to the integral multiple of the number of sheets constituting one set of the facilitating material; and
when the number of positions of the position information is not equal to the integral multiple of the number of sheets constituting one set of the facilitating material, urging a user to rework the input of the position information by displaying a rework message and the input areas for the position information, wherein a number of the input areas is equal to at least the number of sheets constituting one set of the facilitating material as lastly obtained.

18. The image forming method of claim 17, further comprising when the number of the sheets constituting one set of the facilitating material is changed after reception of designation of the position information, urging the user to rework the input operation of the position information.

* * * * *